Oct. 23, 1962   T. S. BRISKIN ET AL   3,059,741
CLUTCH CONTROLLED DRIVE MEANS FOR A SLIDE PROJECTOR
Original Filed March 21, 1955   3 Sheets-Sheet 1

Inventors:
Theodore S. Briskin
Robert L. Moore
Rudolph A. Rom
By: Zabel, Baker, York,
Jones & Guthman
Attorneys Oct. 23, 1962 T. S. BRISKIN ET AL 3,059,741
CLUTCH CONTROLLED DRIVE MEANS FOR A SLIDE PROJECTOR
Original Filed March 21, 1955 3 Sheets-Sheet 2
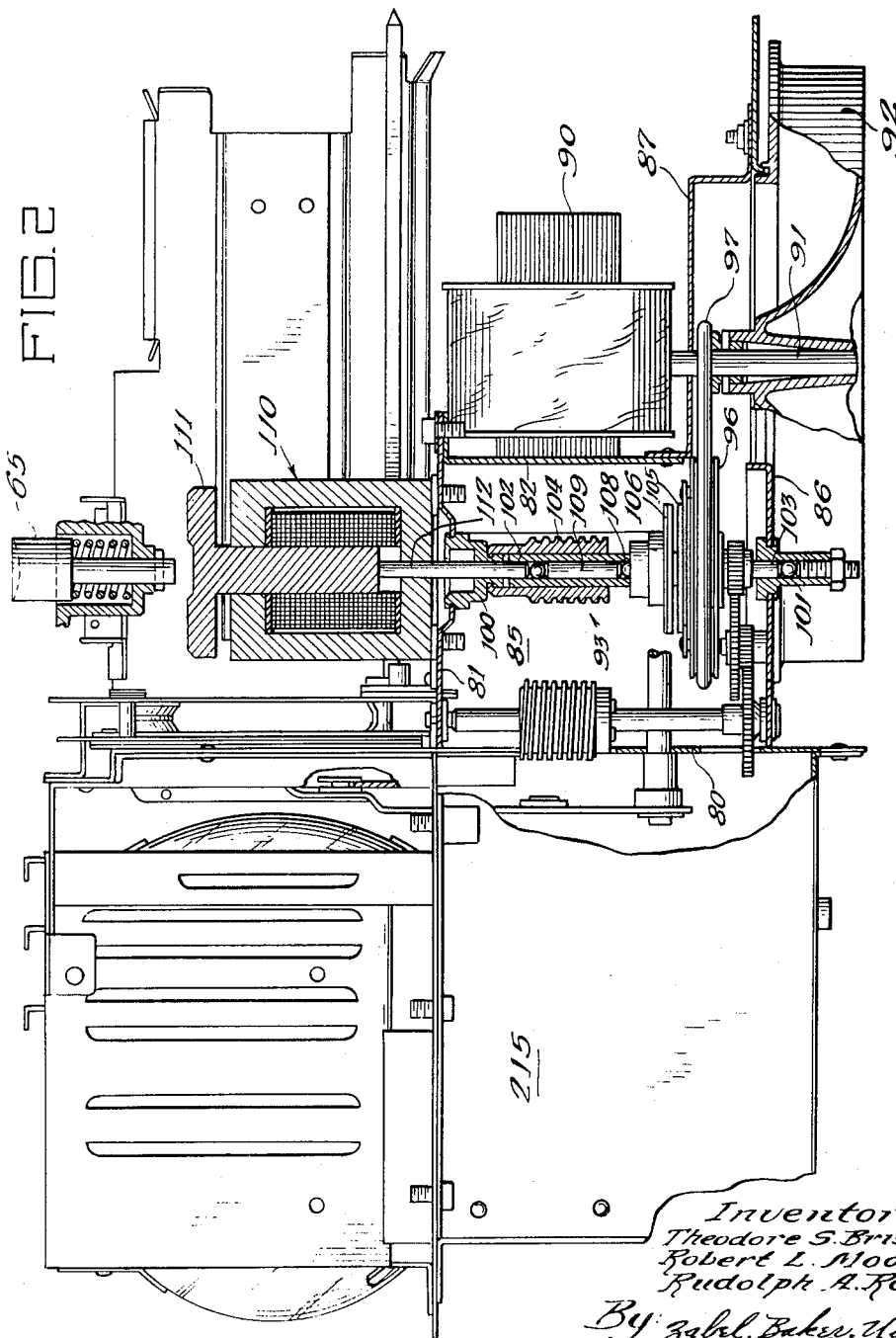
Inventors:
Theodore S. Briskin
Robert L. Moore
Rudolph A. Rom
By Zabel, Baker, York,
Jones & Dithmar
Attorneys Oct. 23, 1962 T. S. BRISKIN ET AL 3,059,741
CLUTCH CONTROLLED DRIVE MEANS FOR A SLIDE PROJECTOR
Original Filed March 21, 1955 3 Sheets-Sheet 3
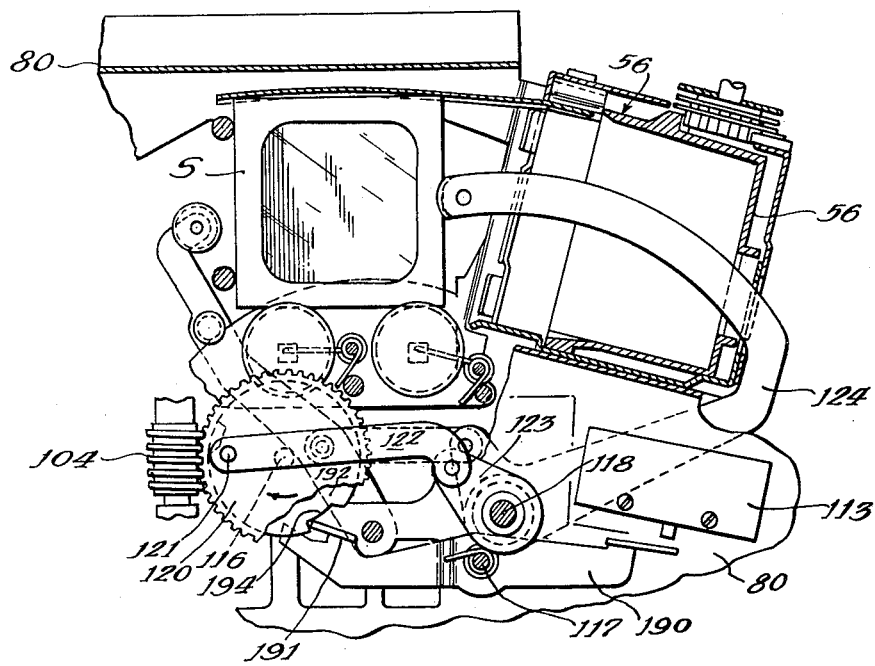
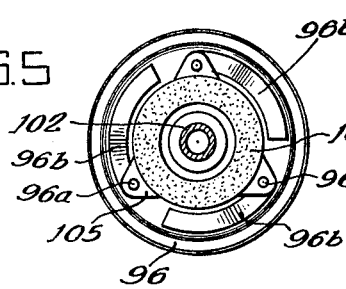
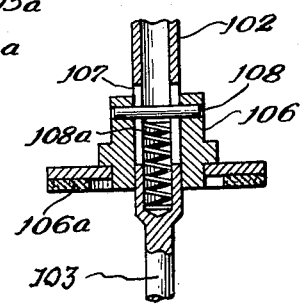
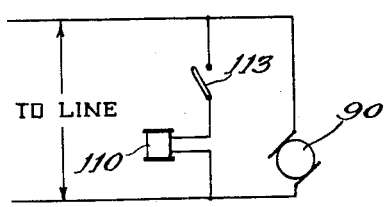
Inventors:
Theodore S. Briskin
Robert L. Moore
Rudolph A. Rom
By: Zabel, Baker, York,
Jones & Dithmar
Attorneys United States Patent Office 3,059,741
Patented Oct. 23, 1962

3,059,741
CLUTCH CONTROLLED DRIVE MEANS FOR A SLIDE PROJECTOR
Theodore S. Briskin, Chicago, Robert L. Moore, La Grange Highlands, and Rudolph A. Rom, Stickney, Ill., assignors, by mesne assignments, to Revere Camera Company, a corporation of Delaware
Original application Mar. 21, 1955, Ser. No. 495,474, now Patent No. 2,968,933, dated Jan. 24, 1961. Divided and this application May 13, 1960, Ser. No. 29,060
9 Claims. (Cl. 192—12)

This invention relates to clutch controlled drive means for a slide projector and is a division of our copending application Serial No. 495,474 filed March 21, 1955, now Patent No. 2,968,933, granted January 24, 1961.

By the use of clutch controlled drive means, a single motor can be utilized to drive both the blower and the projector mechanism. The blower requires a continuously operating motor, whereas the drive mechanism is operated only intermittently, and in particular, when the clutch is actuated to initiate a cycle of operation. The present arrangement can also be used in a slide projector embodying fully automatic operation, for the reason that the continuously operating motor can be utilized to drive continuously operating timing mechanism.

It is an object of this invention to provide an improved clutch controlled drive means whereby a slide projector may be operated semi-automatically, in the sense that the cycle of operation may be manually initiated, and automatically terminated.

Another object is to provide more positive and rapid operation of the clutching action by the use of a solenoid actuated clutch and brake means of the disk type.

According to our invention, we have found that more accurate timing of the clutching action may be obtained by the use of electrical means for effecting disengagement of the clutch, but that both the mechanical and electrical construction can be considerably simplified if manual engagement of the clutch is effected mechanically.

A further object is to provide an improved clutch which is actuated either manually or electromagnetically.

Still another object is to provide an improved clutch construction in which the control element is arranged coaxially with the driving and driven elements.

Other objects, features and advantages will become apparent as the description proceeds.

With reference now to the drawings in which like reference numerals designate like parts:

FIG. 2 is a longitudinal section taken along line 2—2 of FIG. 1;

Figure 1:
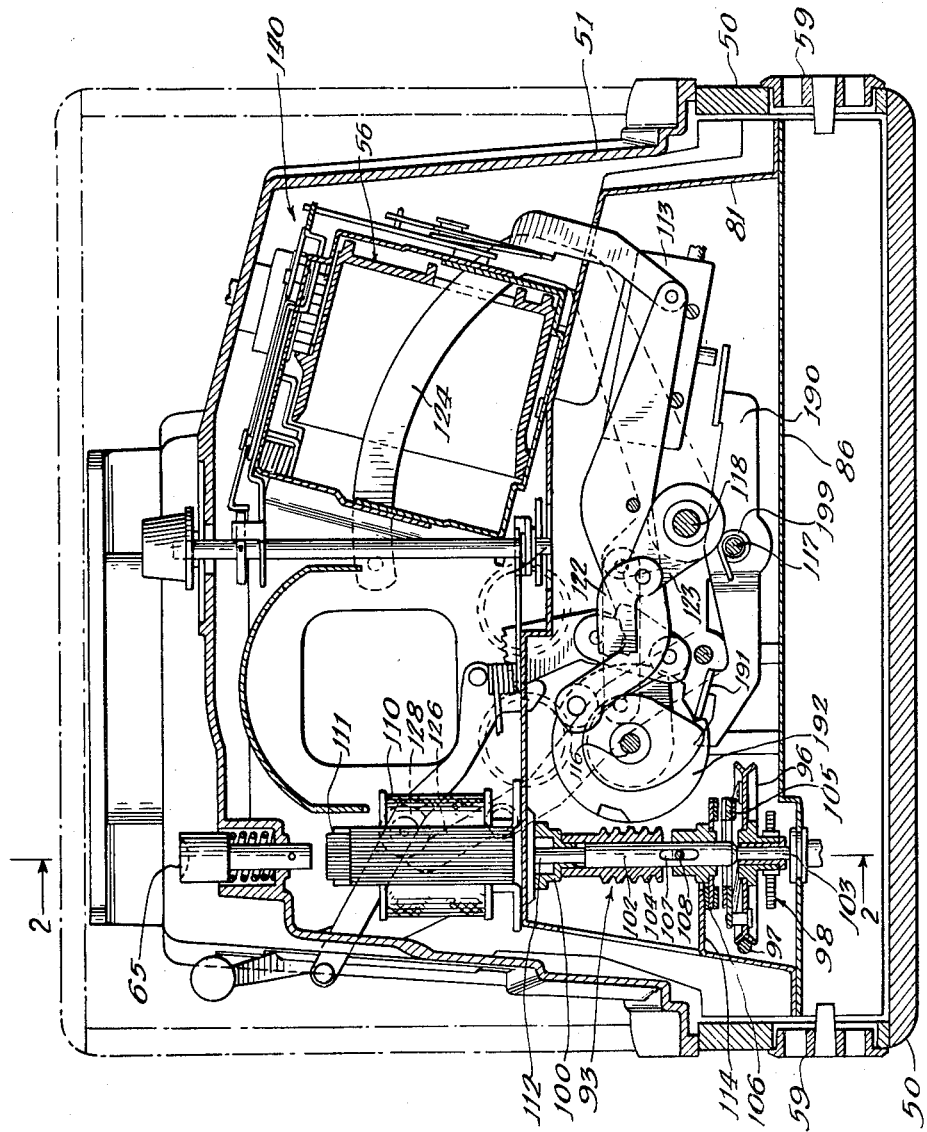
FIG. 1 is a transverse section through a slide projector embodying our invention, certain parts being omitted for the sake of clarity.

FIG. 3 is a fragmentary view similar to FIG. 1, but showing the main gear 120 connecting the worm 104 and the drive shaft 116.

FIG. 4 is an enlarged sectional detail of the clutch driven member 106 taken along line 2—2 of FIG. 1;

FIG. 5 is a plan view of the clutch drive member 105; and

FIG. 6 is an electrical diagram illustrating the relationship of certain of the parts.

The mechanism of the projector shown is mounted in, and partially enclosed by, a box shaped casing 50, shown in FIG. 1. Suitably secured to the upper edges of the casing 50 is a closure member 51 in the form of a die casting which encloses the upper part of the mechanism assembly. This assembly includes magazine locating means, not shown, for slidably receiving a slide magazine 56, shown in broken lines in FIG. 1, within a tunnel portion formed in the slide projector. Slide displacing means, including an injector arm 124, is provided to displace a slide S from the magazine 56 into a projecting position shown in dotted lines in FIG. 1.

A lamp, not shown, is suitably mounted in a lamp chamber 215 (FIG. 2) and an opening in the closure member 51, located above the lamp chamber, serves as an intake for the air stream customarily used for cooling the lamp and lamp chamber.

Grills 59 located at the front and side portions of the casing 50, serve as air outlets, and the air is caused to circulate by means of a blower 92 hereinafter described.

Various operating elements project through the closure member 51, of which only a release button 65 is shown herein.

The complete mechanism assembly, which is enclosed within elements 50 and 51, is shown in FIG. 2. The framework of this assembly comprises a vertical transverse plate 80, a horizontally extending bridge member 81 secured thereto, and a vertical transverse closure plate 82 which cooperates with elements 80 and 81 to form an enclosure 85, shown in FIG. 2, in which certain of the mechanism is located. A bottom plate 86 is also provided for the enclosure 85, and a motor support 87 is provided forwardly and somewhat above the bottom plate 86.

The mechanism is driven by means of a motor 90, shown in FIG. 2 which is mounted on the motor support 87. A blower 92 is mounted at the lower end of the motor shaft 91 so as to be directly driven thereby. Suitably journaled in bridge member 81 and the bottom plate 86 is a clutch assembly 93. A pulley 96 forms a part of the clutch assembly 93, and it is driven from the motor shaft 91 by means of a belt 97. According to this arrangement, the blower 92 and the pulley 93, are directly and continuously driven from the motor 90.

The details of the clutch assembly 93 are shown in FIGS. 1 and 2. A hollow bushing 100 is mounted in the bridge plate 81 and a thrust bushing 101 is mounted in the bottom plate 86. A bored shaft 102 has a reduced end portion 103 which is received in the thrust bushing 101. The bored shaft 102 is an intermediate shaft with respect to the motor 90 and a hereinafter mentioned cam shaft 116 which serves as the drive shaft for the operating mechanism. The bored shaft 102 serves as a hollow sleeve to receive hereinafter mentioned elements 109 and 112. A worm 104, which includes a sleeve portion, is suitably secured to the bored shaft 102 so as to rotate therewith, and the sleeve portion surrounds a reduced portion of the bushing 100 to provide a bearing for the upper end of the bored shaft 102.

The pulley 96 is rotatably mounted on the reduced end portion 103 of the bored shaft 102.

Clutch means are provided to provide a driving connection between the pulley 96 and the bored shaft 102. This clutch means includes a drive member 105 resiliently carried on the pulley 96 by shoulder rivets 96a and spring levers 96b, the drive member being provided with a suitable friction facing 105a. A cooperating driven member 106 is slidably mounted on the bored shaft 102, and is caused to rotate with the shaft 102, by means of a suitable pin 108 which passes through the driven member and through a slot 107 formed in the bored shaft 102. The driven mmeber 106 is also provided with a friction facing 106a. A light spring 108a may be located within the bore of the bored shaft 102 which engages the pin 108 to urge the driven member 106 upwardly into disengaged position.

A rod 109 is received within the bored shaft 102 and bears downwardly against the pin 108 to cause operation of the clutch.

A horizontally extending tab 114 on the bridge member, provided with a suitable friction facing, engages the upper surface of the upwardly biased driven member 106 to serve as a brake when the clutch is disengaged. Thus, depression of rod 109 causes worm 104 to be driven from the motor 90; when the pressure is relieved, the worm ceases its rotation.

A solenoid 110, mounted on bridge member 81, is provided for depressing the rod 109. As shown in FIG. 2, the solenoid 110 is provided with an armature 111 and a second rod 112 extends between the armature 111 and the first rod 109 and serves as a displaceable stem. The release button 65 is located immediately over the armature 111. Thus, when the release button 65 is depressed, the clutch will be engaged, causing rotation of the worm 104. As an alternative mode of operation, the solenoid 110 may be energized, thus causing engagement of the clutch. Deenergization of the solenoid will cause disengagement of the clutch.

A suitable switch 113 shown in FIG. 1 such as a microswitch, is suitably connected in series circuit with the solenoid 110 to control the operation thereof as above outlined; the mechanism for operating the switch will be more fully described hereinafter.

The mechanism driven from the worm 104 can be located with respect to three horizontal shafts which are suitably mounted in spaced vertical plates such as the vertical plate 80 and another (not shown). These three shafts, shown in FIG. 1 are a drive or cam shaft 116, a follower shaft 117, and a rock shaft 118.

Secured to the cam shaft 116 so as to cause rotation thereof is a main gear 120, in the form of a worm wheel, which meshes with and is driven by the worm 104, as shown in FIG. 3. Projecting from the forward surface of the main gear 120 is a crank pin 121 to which is affixed one end of a link 122. The other end of the link is connected to a crank arm 123 which is secured to the rock shaft 118 so as to cause rotation thereof. Thus, continued unidirectional rotation of the main gear 120 will cause oscillation of the rock shaft 118.

The injector arm 124 is mounted on the rock shaft 118 so as to rotate therewith. The injector arm is characterized by an arc-shaped portion which is adapted to project through a suitable slot formed in the magazine 56 so as to engage a slide S held in the magazine and to displace the same into the projecting position shown in FIG. 3.

It has been pointed out that the cam shaft 116 is driven through the clutch assembly 93, and that the clutch is maintained in engagement when the solenoid 110 is in its operated position. It has also been pointed out that the position of the solenoid armature 111 can be controlled either by the release button 65, or by the microswitch 113. The cycling means comprises the elements required to bring the cam shaft 116 to a stop in a predetermined angular position which represents the termination of a complete cycle, with the slide in projecting position, as shown in FIG. 3. As shown in FIG. 3, a follower arm 190 is mounted on the follower shaft 117, and is provided at its left end with an operating follower 191 which is in the form of a bent end, disposed in substantially a horizontal plane. A cycling cam 192 is mounted on the cam shaft 116 for rotation therewith, and the surface of said cam, as shown in FIG. 3, comprises an operating portion and a stop portion, the latter comprising a notch 194.

A spring 199 biases the follower 191 against the cycling cam 192. Thus, the operating follower 191 will ride on the periphery of the cam 192, and will drop into the notch 194 to provide a stop position for the cam shaft 116.

The purpose of the follower arm 190 is to provide a means for operating the microswitch 113. As shown in FIG. 3, when the operating follower 191 is received within notch 194 the right end of the follower arm 190 clears the plunger of the microswitch. However, when the operating follower 191 engages the operating portion or periphery of the cycling cam 192, then the plunger of the microswitch is engaged by the follower arm 190 to operate the switch into closed circuit position, thus establishing and maintaining the circuit through the solenoid 110 and maintaining the clutch assembly 93 in engaged position.

To summarize the operation of the cycling means, after the clutch has been engaged, rotation of the cam shaft 116 will cause the cycling cam 192 to rock the follower arm 190 and close the solenoid circuit. The clutch will be automatically disengaged at the conclusion of a full cycle, when the operating follower 191 drops into the notch 194.

The operating mechanism of the slide projector includes slide displacing means, magazine advancing means, and shutter control means, all of which are driven from the main gear 120, the intermittent motion of which is controlled by the clutch 93. The operating mechanism is represented herein only by the injector arm 124 shown in FIG. 1. The magazine advance and the shutter control can be actuated by suitable cams, not shown, secured to the cam shaft 116 which are timed with respect to the operation of the slide displacing means, as pointed out in the above mentioned copending application to provide semi-automatic operation of the slide projector.

According to the present invention, the cycle of operation is initiated by depressing the release button 65 which operates through the rod 112 and the armature 111 in the manner previously described to cause engagement of the clutch 93, after which the solenoid 110 takes over, and the cycle of operation carries through to its completion, even though the pressure on the button 65 is released. At the completion of the cycle, the spring biased driven member 106 moves upwardly into engagement with the friction facing on the tab 114, thus providing braking mechanism which causes the driven member to come to an immediate stop. The worm connection between the driven member 106 and the cam shaft 116 provides an irreversible mechanical connection so that the inertia of the parts of the operating mechanism is not fed back to the brake, thereby providing the instantaneous braking action which is desired in order to cause the injector arm 124 to come to a stop in a predetermined position.

By the use of a solenoid actuated disk clutch, more positive and rapid operation is obtained than by the use of other types of clutching action. Furthermore, the solenoid permits electrical control of disengagement rather than mechanical control, which reduces the load on the cycling cam 192. Furthermore, the particular arrangement herein disclosed combines mechanical and electrical control elements in such a manner that holding relays are eliminated, and only the single control switch 113 is required.

Although only a preferred embodiment of our invention has been shown and described herein, it will be understood that various modifications and changes may be made in the construction shown without departing from the spirit if our invention as pointed out in the appended claims.

We claim:

1. In a slide projector, the combination of a motor mounted therein, a drive shaft adapted to be intermittently driven from said motor, cycling means to control the operation of said drive shaft, said cycling means comprising a clutch interposed between said motor and said drive shaft, cam means rotating with said drive shaft, and electromagnetic means for maintaining clutch in engaged position and controlled by said cam means to cause disengagement of said clutch and to terminate the cycle of operation, and manually operated mechanical clutch control means for actuating said clutch into engaged position in order to initiate the cycle of operation.

2. In a slide projector, the combination of a motor mounted therein, a drive shaft adapted to be intermittently driven from said motor, a manually actuated clutch interposed between said motor and said drive shaft, cam means rotating with said drive shaft, electromagnetic means for actuating said clutch, and a switch in series circuit with said electromagnetic means and actuated by said cam means to maintain said switch in closed position after the initial closing thereof by said cam means and to open the same as said cam means rotates into a predetermined angular position thereby breaking the circuit to said electromagnetic means to cause disengagement of said clutch and to terminate a cycle of operation, said electromagnetic means including a solenoid having an armature, and means providing for manual displacement of said armature to cause initial engagement of said clutch, initial displacement of said cam means, and initial closing of said switch.

3. In a slide projector, the combination of a motor, a drive shaft designed for intermittent operation, an intermediate shaft connected to said drive shaft, a clutch including a driving element and an axially shiftable driven element coaxially arranged with respect to said intermediate shaft, said driven element being non-rotatably secured thereto, and said driving element being rotatably mounted thereon and driven from said motor, means biasing said driving and driven elements into disengaged positions, a solenoid including an armature for actuating said clutch, and manually operated means engaging said armature to depress the same so that said clutch may be actuated manually.

4. The combination claimed in claim 3 in which the upper portion of said intermediate shaft is in the form of a hollow sleeve, an axially displaceable stem disposed within said hollow sleeve for controlling the position of said driven element, and in which said armature is disposed above said stem and in engagement therewith, whereby displacement of said armature, either by operation of said solenoid or by said manually operated means, will actuate said clutch into engaged position.

5. The combination claimed in claim 3 including a worm mounted on said intermediate shaft, and a worm wheel mounted on said drive shaft and meshing with and driven by said worm to provide an irreversible driving connection between said intermediate shaft and said drive shaft whereby the inertia of said drive shaft will not feed back to said intermediate shaft after disengagement of said clutch.

6. The combination claimed in claim 5 which includes a braking element located adjacent said driven element and adapted to be engaged thereby when said clutch is disengaged.

7. The combination as claimed in claim 3 in which said motor includes an armature shaft, and a blower affixed to said armature shaft whereby said blower will be continuously driven by said motor irrespective of the operation of said clutch.

8. In a slide projector, the combination of a motor, a drive shaft designed for intermittent rotation, a clutch interposed between said drive shaft and said motor, a solenoid having an armature located for actuating said clutch, a normally open switch connected in series with said solenoid, cam means on said drive shaft for maintaining said switch in closed circuit position during rotation of said drive shaft through one revolution and for causing said switch to move to open circuit position at the termination of a cycle of operation consisting of a single revolution of said cam, whereby the cycle terminating means for said intermittently rotating drive shaft is located on the driven side of said clutch, and manually actuated means for engaging the armature of said solenoid to initiate the cycle of operation.

9. In a slide projector having a motor and operating mechanism to displace a slide into a projecting position, and a clutch connecting said motor and said operating mechanism, the combination of a solenoid having an armature for causing movement of said clutch into engaged position, manually operable means located above said armature and engaging same when depressed to effect initial engagement of said clutch, and means actuated by said operating mechanism for energizing said solenoid in order to maintain said clutch in its engaged position and for de-energizing said solenoid in order to disengage said clutch when said operating mechanism is in a position corresponding to slide projecting position.

References Cited in the file of this patent

UNITED STATES PATENTS

| | | |
|---|---|---|
| 2,334,003 | Heintz | Nov. 9, 1943 |
| 2,401,506 | Pechkranz | June 4, 1946 |
| 2,475,722 | Sabel et al. | July 12, 1949 |
| 2,503,239 | Antos | Apr. 11, 1950 |
| 2,532,266 | Andres | Nov. 28, 1950 |
| 2,795,169 | Wattring | June 11, 1957 |
| 2,860,748 | Turner et al. | Nov. 18, 1958 |